US008885668B2

(12) United States Patent
Sylvain

(10) Patent No.: US 8,885,668 B2
(45) Date of Patent: Nov. 11, 2014

(54) AUTOMATED URL TRANSMISSION TO ENABLE MULTIMEDIA SERVICES

(75) Inventor: Dany Sylvain, Gatineau (CA)

(73) Assignee: Genband US LLC, Plano, TX (US)

( * ) Notice: Subject to any disclaimer, the term of this patent is extended or adjusted under 35 U.S.C. 154(b) by 872 days.

(21) Appl. No.: 12/916,461

(22) Filed: Oct. 29, 2010

(65) Prior Publication Data

US 2012/0106574 A1 May 3, 2012

(51) Int. Cl.
*H04J 3/24* (2006.01)
*H04L 12/18* (2006.01)
*H04L 29/08* (2006.01)
*H04L 29/06* (2006.01)
*H04L 29/12* (2006.01)

(52) U.S. Cl.
CPC ............. *H04L 65/40* (2013.01); *H04L 61/1594* (2013.01); *H04L 12/1818* (2013.01); *H04L 67/02* (2013.01); *H04L 61/106* (2013.01); *H04L 61/3085* (2013.01); *H04L 61/307* (2013.01); *H04L 65/1069* (2013.01); *H04L 61/605* (2013.01)
USPC ......................................................... 370/474

(58) Field of Classification Search
None
See application file for complete search history.

(56) References Cited

U.S. PATENT DOCUMENTS 6,842,452 B1 * 1/2005 Muller ........................... 370/389
2008/0275977 A1 * 11/2008 Schmidt et al. ............... 709/223

* cited by examiner

*Primary Examiner* — Andrew Lai
*Assistant Examiner* — Leon Andrews
(74) *Attorney, Agent, or Firm* — Haynes and Boone, LLP

(57) ABSTRACT

A method is disclosed for providing multimedia services includes receiving from a first user a request for engaging in multimedia services with a second user, generating a Uniform Resource Locator (URL), transmitting the URL to an address associated with the second user, enabling voice communication between the first user and the second user, and enabling multimedia services between the first user and the second user in response to receiving an indication that the second user has accessed the URL.

25 Claims, 8 Drawing Sheets

AUTOMATED URL TRANSMISSION TO ENABLE MULTIMEDIA SERVICES

TECHNICAL FIELD

The present disclosure relates to enabling multimedia services, and in particular to enabling multimedia services via automated Uniform Resource Locator (URL) transmission.

BACKGROUND

A multimedia-enabled endpoint can only use multimedia services when interacting with another multimedia endpoint, severely restricting the usage and potential usefulness of multimedia services. Some partial solutions, such as described in U.S. Patent Application Publication Number 2009/0164645 to Sylvain, allow a voice-only user (e.g., a phone user) to leverage a web browser to gain access to multimedia services. However, such existing solutions require the voice user to know a priori the multimedia Uniform Resource Locator (URL) for a multimedia user, for example received from the multimedia user via email. This scenario functions reasonably well if the voice user initiates a multimedia session by accessing the multimedia user's URL but is not effective if the multimedia user wants to initiate the multimedia session. In the latter scenario, one commonly implemented method involves the URL being verbally communicated or emailed by the multimedia user during a call. Given the apparent desire to share multimedia services amongst communicating parties, there is a need for an effective and efficient technique to allow users to initiate and engage in the sharing of multimedia services.

SUMMARY

In one embodiment, in a communication environment where a multimedia-enabled user (user A) calls a called party (user B) having voice media support, a service node associated with user A sends a Uniform Resource Locator (URL) to user B. At the same or later time, user B may access the service node associated with user A via a web portal and engage in multimedia services with user A.

In accordance with an exemplary and non-limiting embodiment, a method for providing multimedia services includes receiving from a first user a request for engaging in multimedia services with a second user. A URL is generated and is transmitted to an address associated with the second user. Voice communication is then enabled between the first user and the second user and, in response to receiving an indication that the second user has activated the URL, multimedia services are enabled between the first user and the second user.

In accordance with another exemplary and non-limiting embodiment, a service node comprises at least one communication interface and a control system associated with the at least one communication interface and is adapted to receive from a first user a request for engaging in multimedia services with a second user, generate a URL, transmit the URL to an address associated with the second user, enable voice communication between the first user and the second user, and enable multimedia services between the first user and the second user in response to receiving an indication that the second user has activated the URL.

In accordance with another exemplary and non-limiting embodiment, a method for providing multimedia services comprises transmitting to a service node a request from a first user for engaging in voice communication with a second user and multimedia services with the second user, receiving from the service node an indication that voice communication between the first user and the second user has been established, and receiving from the service node an indication that multimedia services between the first user and the second user have been established after the second user has accessed a URL sent by the service node to the second user for the purpose of enabling multimedia services.

The subject matter described herein for automated URL transmission to enable multimedia services may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be located on plural computing platforms.

Those skilled in the art will appreciate the scope of the present invention and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the invention, and together with the description serve to explain the principles of the invention.

DETAILED DESCRIPTION

The embodiments set forth below represent the necessary information to enable those skilled in the art to practice the invention and illustrate the best mode of practicing the invention. Upon reading the following description in light of the accompanying drawings, those skilled in the art will understand the concepts of the invention and will recognize applications of these concepts not particularly addressed herein. It should be understood that these concepts and applications fall within the scope of the disclosure and the accompanying claims.

In an exemplary and non-limiting embodiment, a method for providing multimedia services includes receiving from a first user a request for engaging in multimedia services with a second user, generating a Uniform Resource Locator (URL), transmitting the URL to an address associated with the second user, enabling voice communication between the first user and the second user, and enabling multimedia services between the first user and the second user in response to receiving an indication that the second user has activated the URL.

Figure 1:
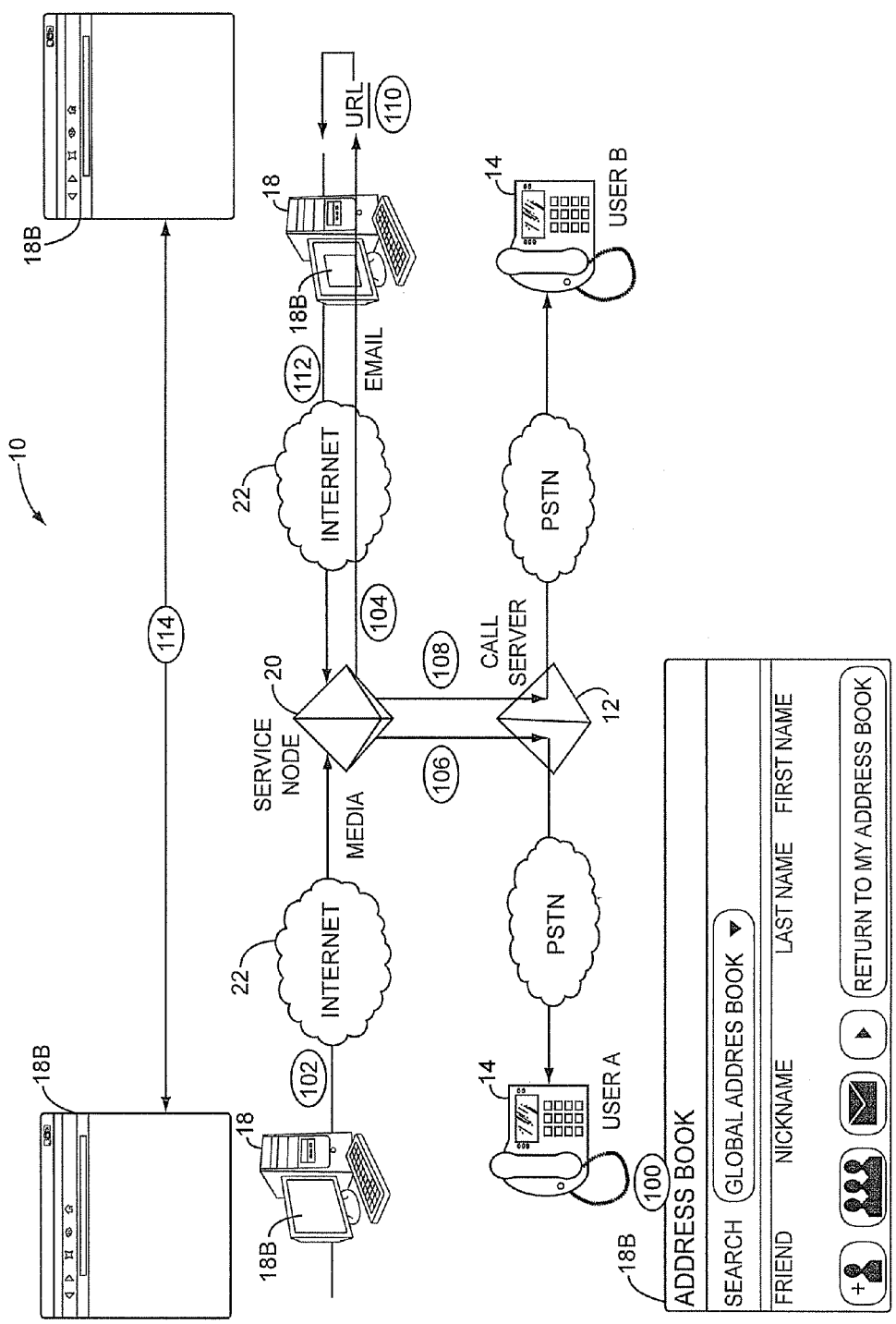
FIG. 1 is a block representation of a communication environment according to one embodiment of the disclosure.

Prior to delving into the details of select embodiments, an overview of an exemplary communication environment 10 is provided in association with FIG. 1. In general, a call server 12 is provided to facilitate communications among at least two communication devices 14. In an exemplary embodiment, computing devices 18 are communicatively coupled via a service node 20 and communicate via a packet based network such as the Internet 22.

Notably, the various devices 14, 18, may take virtually any form, including wired or wireless telephones, personal computers, personal digital assistants, and the like. The labels provided for these devices in this description and the following claims are used only to improve readability and separately identify the devices. As such, any of the devices 14, 18 may support a limited or full range of multimedia applications, services, and communications, including voice. Alternatively, each communication device 14 may support primarily voice communications applications through packet or circuit switched connections.

In general, one embodiment of the present invention allows a first user who is associated with the computing device 18 to direct the origination of a call between a first communication device 14 associated with the first user toward a second user using a communication device 14 associated with the second user. As used herein, "user A" refers to a user of a first communication device 14 and a first computing device 18 acting as the initiator of a communication to another communication device 14 and another computing device 18 associated with another user. Further, "user B" refers to a user of a second communication device 14 and a second computing device 18 who is further the intended recipient of a communication from user A. As a result, where appropriate, the term "user A" may be used interchangeably with "the user of the communication device 14 and the computing device 18" and "user B" may be used interchangeably with "the user of the communication device 14 and the computing device 18." In some cases, the communication device 14 and the computing device 18 may reside in the same physical device, for example in a wireless smartphone. During the following discussion wherein there is generally described the operation of the communication environment 10, there are illustrated various step designations (e.g., "step 100"). These step designations, referred to in the Specification, are intended to broadly indicate the flow of information described in the Specification and are illustrated in the figures as element numbers, wherein each element is associated with the step designation. For example, element number "100" in FIG. 1 is associated with "step 100" described below.

As illustrated, user A, having logged into a web portal hosted on the service node 20, accesses the web portal via a browser 18B running on user A's computing device 18 (step 100). In an exemplary embodiment, the browser 18B displays a list of potential other users with which user A can engage in communication. The information may be stored in, for example, the computing device 18 and displayed via a graphical user interface (GUI).

Figure 2:
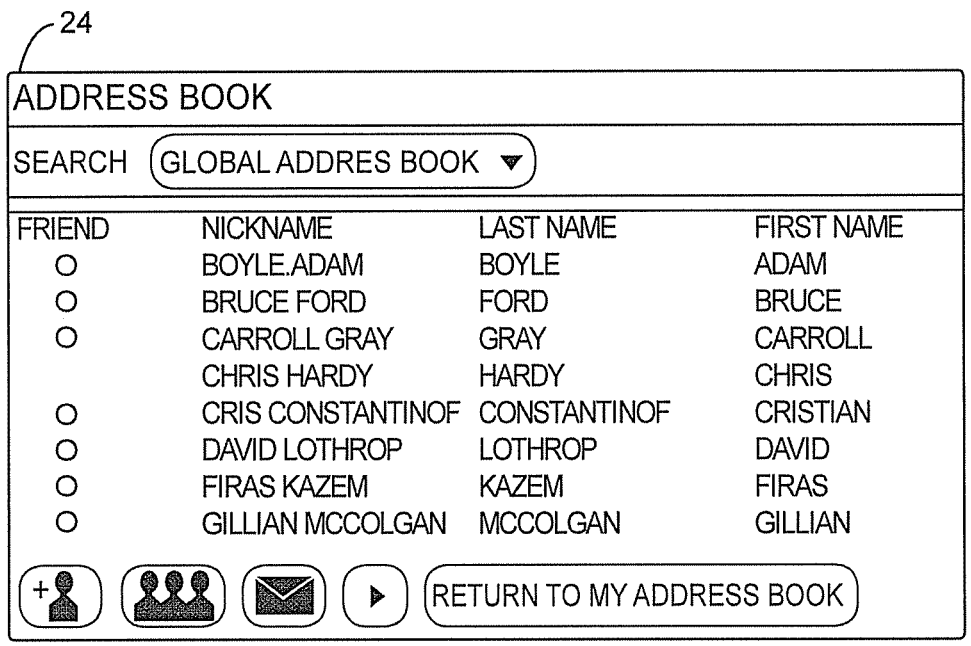
FIG. 2 is an exemplary graphical user interface (GUI) according to one embodiment of the disclosure.
Figure 3:
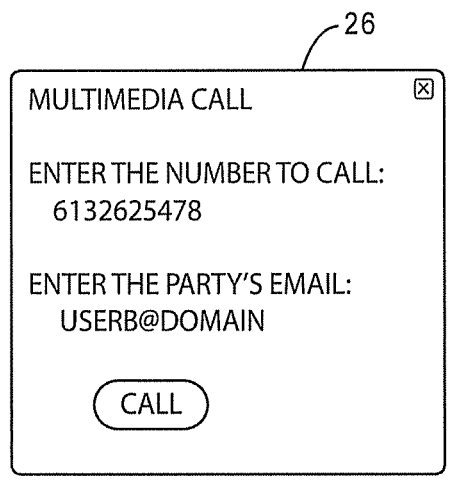
FIG. 3 is another exemplary GUI according to one embodiment of the disclosure.

With reference to FIG. 2, there is illustrated an exemplary GUI 24 in the form of an address book. User A proceeds to log in and access a web portal hosted on the service node 20 via the browser 18B running on user A's computing device 18. In the exemplary embodiment illustrated, selecting an entry results in the transmission to the service node 20 of information allowing the service node 20 to enable communication with both the communication device 14 and the computing device 18 of user B (FIG. 1, step 102). Such information may include a directory number (DN) for user A and a DN for user B as well as an address, such as an email, Short Messaging Service (SMS), Multimedia Messaging Service (MMS), or instant messaging (IM) address, for user B. In an alternative exemplary embodiment, user A may enter information allowing the service node 20 to enable communication with both the communication device 14 and the computing device 18 of user B via a GUI. With reference to FIG. 3, there is illustrated an exemplary GUI 26 for entering such information. Alternatively, most of the information may already be available by the service node 20, for example via the user's network address book. In this embodiment, in step 102 a reference is provided to an entry in the user's network address book.

With continued reference to FIG. 1, upon receiving the aforementioned information from user A, such as via the Internet 22, the service node 20 forwards a URL to user B. In an exemplary embodiment the URL forms a part of a message sent from the service node 20 to an address associated with user B and provides a link through which user B can join in a communication session with user A (step 104). In approximate parallel fashion, the service node 20 directs the call server 12 to initiate a voice call to user A at user A's DN (step 106). In the exemplary embodiment illustrated, a call is initiated by the call server 12 to the communication device 14 of user A and user A answers the call.

At approximately the same time as the service node 20 directs the call server 12 to initiate a voice call to user A at user A's DN, the service node 20 directs the call server 12 to initiate a voice call to user B at user B's DN (step 108). In the exemplary embodiment illustrated, a call is initiated by the call server 12 to the communication device 14 of user B and user B answers the call whereupon a voice call is established between user A and user B.

Figure 4:
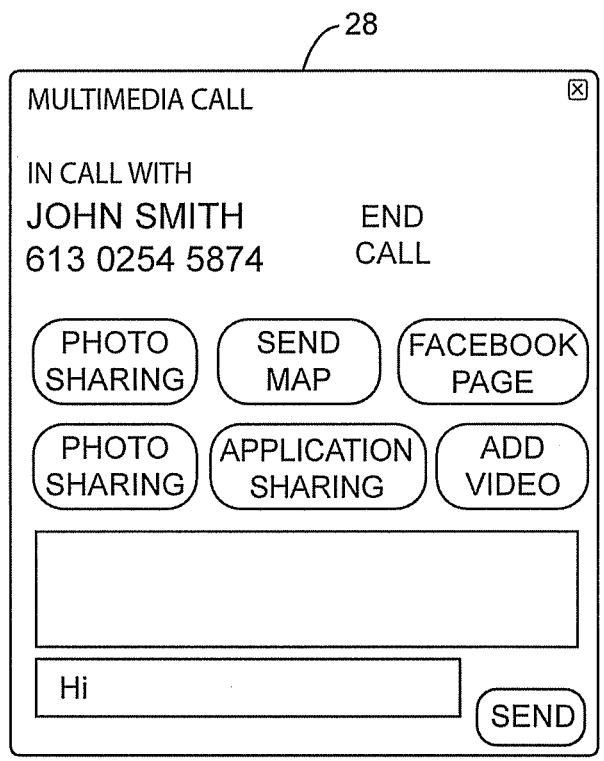
FIG. 4 is another exemplary GUI according to one embodiment of the disclosure.

Next, while user A and user B are engaged in voice call communication, user B accesses the message comprising the URL link for engaging in a multimedia communication session with user A (step 110). In an exemplary embodiment, user B may access the URL via a browser 18B running on user B's computing device 18. User B next activates the URL, such as by clicking on the link, and a request to engage in a multimedia communication session with user A is sent to the service node 20 (step 112). In an exemplary embodiment, user B may be required to first login to the service node 20 or, lacking an account, may be instructed by the service node 20 to create an account. In response to receiving the request, the service node 20 replies to user B with information indicative of multimedia communication options which may be displayed, for example, in a multimedia interaction GUI. With reference to FIG. 4, there is illustrated an exemplary embodiment of a multimedia interaction GUI 28. In the exemplary embodiment illustrated, there is provided information indicative of the party with whom user B is presently engaged in a voice call, numerous buttons each associated with related multimedia sharing, text fields for exchanging messages, and the like.

With continuing reference to FIG. 1, the service node 20 updates the browser 18B of user A, such as by causing the display of a multimedia interaction GUI 28 (FIG. 4), thus enabling multimedia services between user A and user B (step 114).

Figure 5A:
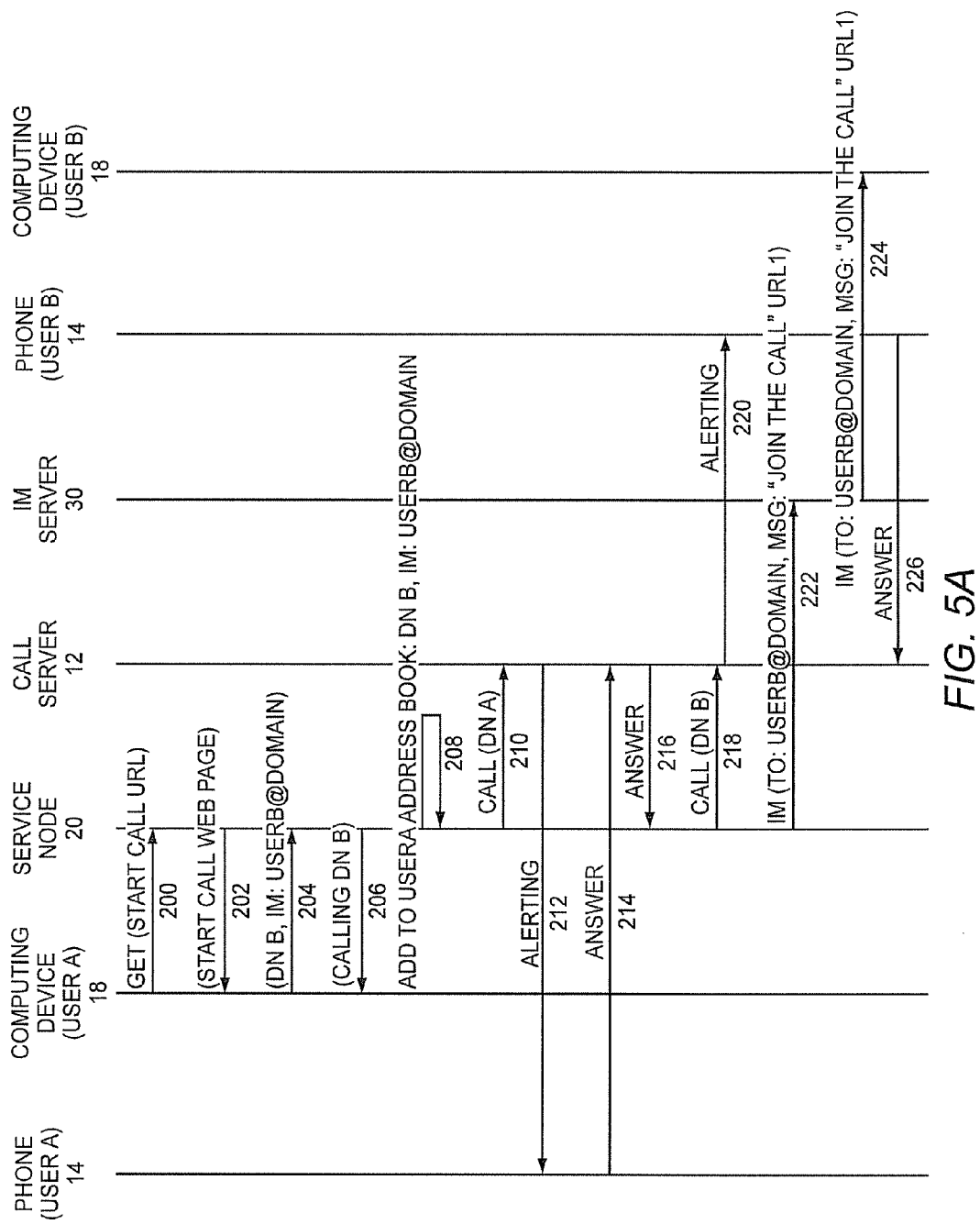
FIGS. 5A and 5B provide an exemplary communication flow according to one embodiment of the disclosure.
Figure 5B:
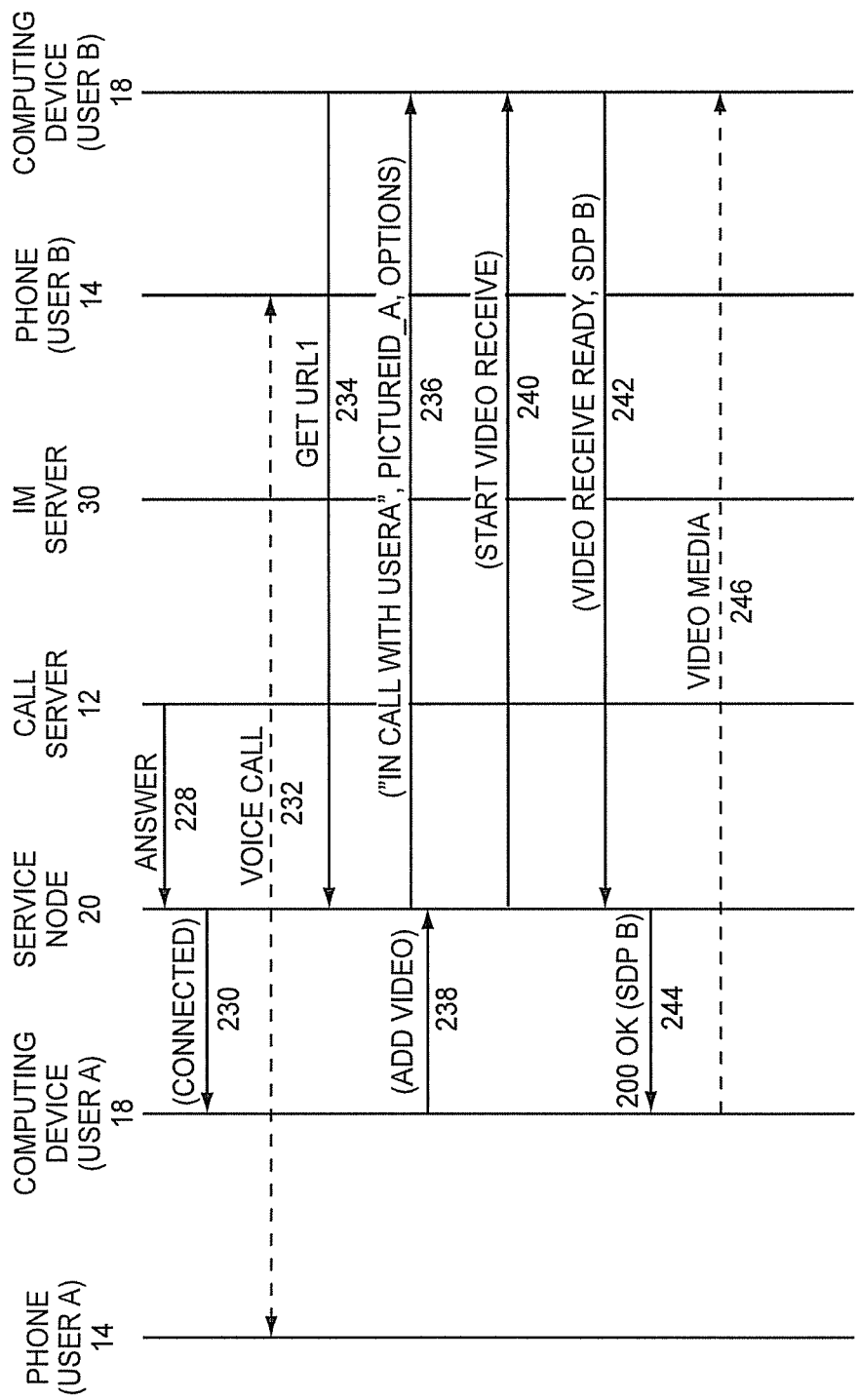

With reference to FIGS. 5A and 5B, a communication flow is provided to illustrate an exemplary scenario for utilizing the service node 20 to augment an existing voice call between user A and user B with multimedia services. Those skilled in the art will recognize that this is only an exemplary scenario according to one embodiment disclosed herein, and the aspects and elements represented in the communication flow are not all deemed necessary for implementation of the present invention. In particular, the communication flow is intended to illustrate numerous optional aspects and features that are supplemental to the core concepts of the embodiments disclosed herein. For purposes of clarity, the communication device 14 of user A associated with DNA is labeled "Phone (user A) 14." Likewise the communication device 14 of user B associated with DN B is labeled "Phone (user B) 14." Similarly, the computing device 18 of user A is labeled "computing device (user A) 18" and the computing device 18 of user B is labeled "computing device (user B) 18." There is additionally illustrated an IM server 30. The IM server 30 operates to receive a message and a desired destination and to transmit the message to the destination in the form of an IM. While illustrated as utilizing an IM server 30, in other exemplary embodiments, such as that described above, such messages may be transmitted via alternative electronic means including, but not limited to, via email, SMS, and MMS.

At some point, user A decides to initiate a voice call and a multimedia communication session with user B from the computing device (user A) 18. In an exemplary embodiment, the computing device (user A) 18 transmits a request to the service node 20 to establish a voice call between phone (user A) 14 and phone (user B) 14 and to forward a URL to user B providing user B with a link to a multimedia communication session (step 200). In response to the receipt of the request from the computing device (user A) 18, the service node 20 instructs the browser 18B of the computing device (user A) 18 to display, for example, the GUI 26 (step 202). In response, user A provides a DN for user B as well as an email, SMS, MMS, or IM address for user B and transmits the information to the service node 20 (step 204). As described above, in an alternative embodiment, user A may utilize a GUI, such as the GUI 24, to enter such information and transmit the information to the service node 20. Alternatively, most of the information may already be available by the service node 20, for example via the user's network address book. In this embodiment, in step 204, a reference is provided to an entry in the user's network address book. The service node 20 may then inform the computing device (user A) 18 that a voice call to user B has been initiated whereupon the browser 18B of user A may display information, such as in the multimedia interaction GUI 28, indicative of a call in process status (step 206).

In an exemplary embodiment, the service node 20 may optionally store the information received from user A in step 204 in a memory device associated with the service node 20 for later retrieval (step 208). The service node 20 proceeds to request the call server 12 to initiate a voice call to the phone (user A) 14 (step 210). The call server 12 in turn alerts the phone (user A) 14 to a phone request such as by causing the phone (user A) 14 to ring (step 212). When user A answers the phone (user A) 14, the answer event is transmitted to the call server 12 (step 214), which proceeds to notify the service node 20 that user A has answered the request to initiate a voice call to the phone (user A) 14 (step 216).

The service node 20 proceeds to request the call server 12 to initiate a voice call to the phone (user B) 14. The call server 12 in turn alerts the phone (user B) 14 to a phone request such as by causing the phone (user B) 14 to ring (step 220). In approximate parallel fashion, the service node 20 transmits a message to the IM server 30 wherein the message comprises, at least, an address to which the message is to be delivered and an embedded URL link. In one embodiment, the message may include a text instruction for display to user B (step 222). Upon receiving the message from the service node 20, the IM server 30 transmits the message to the computing device (user B) 18 (step 224).

When user B answers the phone (user B) 14, the answer event is transmitted to the call server 12 (step 226), which proceeds to notify the service node 20 that user B has answered the request to initiate a voice call to the phone (user B) 14 (step 228). The service node 20 proceeds to inform the computing device (user A) 18 that user A is connected to user B via a voice call (step 230). The voice call having been established, user A and user B may engage in voice communications between the phone (user A) 14 and the phone (user B) 14 (step 232).

While described sequentially, steps 210-214 may be performed in approximate parallel with steps 216-220 and 226-228 as well as with steps 222-224. At any time during the voice call between user A and user B, user B can activate the URL contained in the message previously transmitted to the computing device (user B) 18 resulting in access to the service node 20 (step 234). Upon receiving the request for access to the URL, the service node 20 replies to the computing device (user B) 18 with information to populate the multimedia interaction GUI 28 displayed on the browser 18B of user B (step 236). Such information may comprise, for example, text information describing the communication session with user A, a picture or other identifier of user A, and available multimedia options to be made available to user B.

In the exemplary embodiment disclosed, user A selects an option on the multimedia interaction GUI 28 displayed on the browser 18B of the computing device (user A) 18 and instructs the service node 20 of user A's desire to engage in a multimedia session comprising, in this example, transmitting video to user B (step 238). The service node 20 responds by instructing the computing device (user B) 18 to prepare to start receiving video from user A (step 240). The computing device (user B) 18 responds to the service node 20 that it is ready to begin to receive video (step 242) and the service node 20 informs the computing device (user A) 18 that it is OK to commence video transmission (step 244). In response, user A commences to engage in a multimedia sharing session with user B comprising the transmission of video media from the computing device (user A) 18 to the computing device (user B) 18 (step 246).

Figure 6:
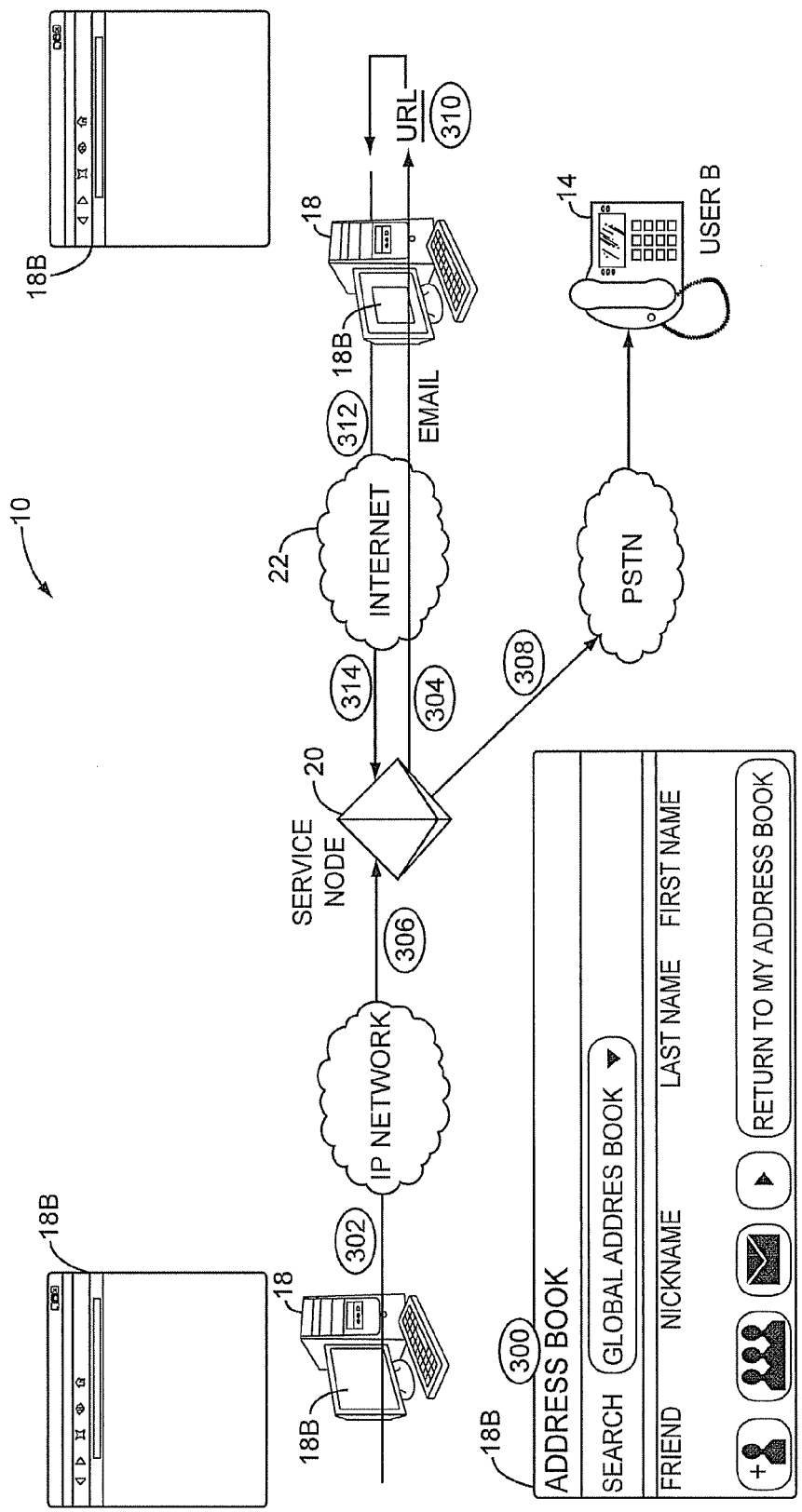
FIG. 6 is a block representation of a communication environment according to another embodiment of the disclosure.

With reference to FIG. 6, an illustration is provided of the communication environment 10 illustrating an exemplary scenario similar to that of FIG. 1 but wherein user A is engaged in all packet based communication absent a circuit connection to the communication device 14 of user B. In the embodiment illustrated, user A operates a multimedia Session Initiation Protocol (SIP) client running on the computing device 18 associated with user A while user B is enabled to access data from the service node 12 via the computing device 18 associated with user B.

As illustrated, user A, having logged into a web portal hosted on the service node 20, accesses the web portal via the browser 18B running on user A's computing device 18 (step 300). In an exemplary embodiment, the browser 18B displays a list of potential other users with which user A can engage in communication. The information may be stored in, for example, the computing device 18 and displayed via a GUI, such as the GUI 24 described above with reference to FIG. 2. In the exemplary embodiment illustrated, selecting an entry results in the transmission to the service node 20 of information allowing the service node 20 to enable communication with both the communication device 14 and the computing device 18 of user B (step 302). Such information may include a DN for user A and a DN for user B as well as an address, such as an email, SMS, MMS, or IM address for user B. In an alternative exemplary embodiment, user A may enter information allowing the service node 20 to enable communication with both the communication device 14 and the computing device 18 of user B via a GUI.

Upon receiving the aforementioned information from user A, such as via an Internet Protocol (IP) network, the service node 20 or the softclient running on the computing device 18 of user A forwards a URL to user B (step 304). In an exemplary embodiment the URL forms a part of a message sent from the service node 20 to an address associated with user B and provides a link through which user B can join in a communication session with user A. In approximate parallel fashion, the softclient running on the computing device 18 of user A initiates a Voice over Internet Protocol (VoIP) call to the communication device 14 utilizing user B's DN (step 306). In the exemplary embodiment illustrated, the service node 20 routes the call to user B's DN and, when user B answers, a voice call between user A and user B is established (step 308).

Next, while user A and user B are engaged in voice call communication, user B accesses the message comprising the URL link for engaging in a multimedia communication session with user A (step 310). In an exemplary embodiment, user B may access the URL via the browser 18B running on user B's computing device 18. User B next activates the URL, such as by clicking on the link, and a request to engage in a multimedia communication session with user A is sent to the service node 20 (step 312). In response to receiving the request, the service node 20 replies to user B with information indicative of multimedia communication options which may be displayed, for example, in a multimedia interaction GUI 28 (FIG. 4). In the exemplary embodiment illustrated, there is provided information indicative of the party with whom user B is presently engaged in a voice call, numerous buttons each associated with related multimedia sharing, text fields for exchanging messages, and the like. The service node 20 updates the browser 18B of user A, such as by causing the display of the multimedia interaction GUI 28, thus enabling multimedia services between user A and user B (step 314).

Figure 7:
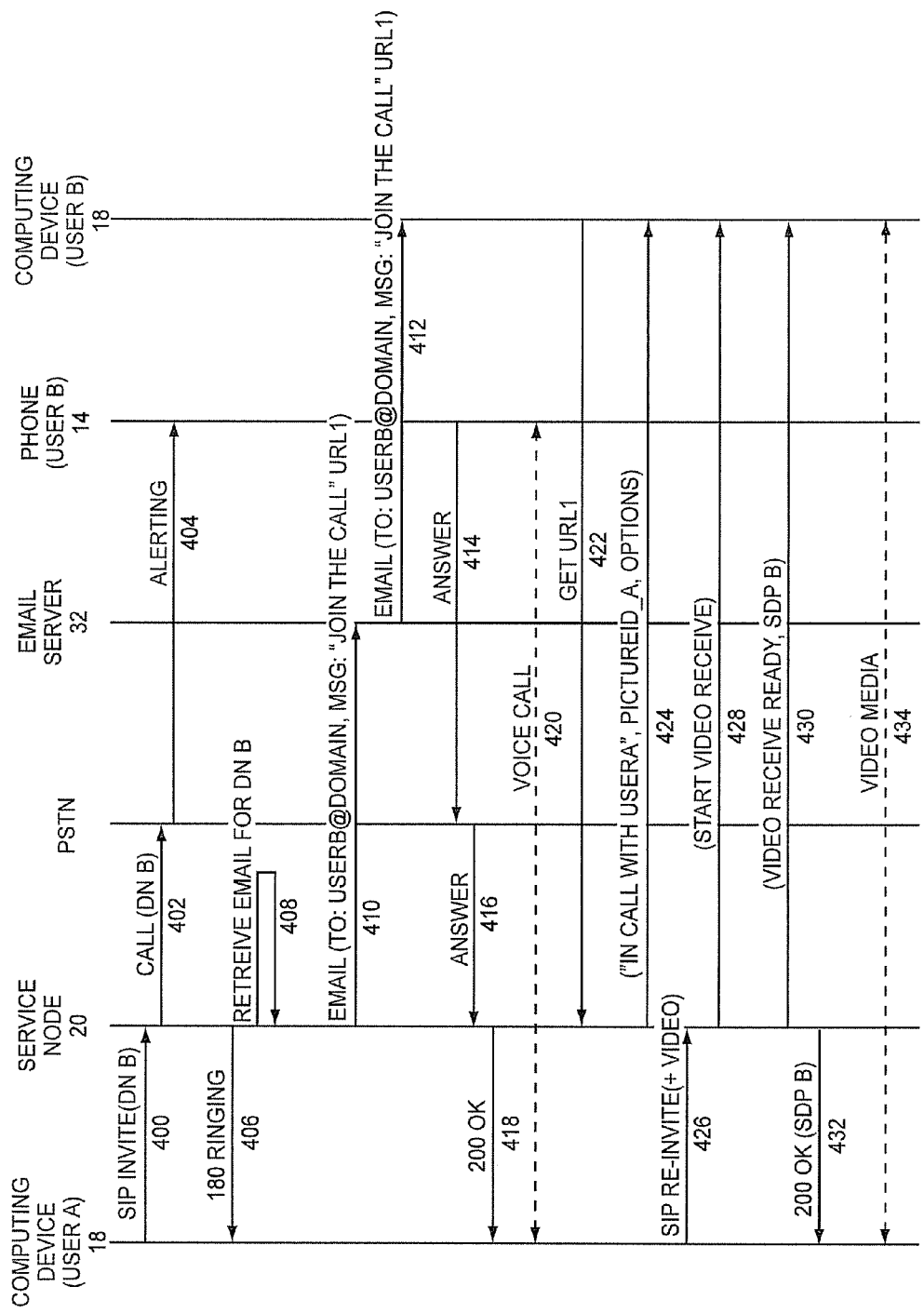
FIG. 7 provides an exemplary communication flow according to one embodiment of the disclosure.

With reference to FIG. 7, a communication flow is provided to illustrate an exemplary scenario of augmenting an existing voice call between user A and user B with multimedia services wherein user A is engaged in all packet based communication. Those skilled in the art will recognize that this is only an exemplary scenario according to one embodiment disclosed herein, and the aspects and elements represented in the communication flow are not all deemed necessary for implementation of the present invention. In particular, the communication flow is intended to illustrate numerous optional aspects and features that are supplemental to the core concepts of the embodiments disclosed herein. For purposes of clarity, the communication device 14 of user B associated with DN A is labeled "Phone (user B) 14." Similarly, the computing device 18 of user A is labeled "computing device (user A) 18" and the computing device 18 of user B is labeled "computing device (user B) 18." There is additionally illustrated an email server 32. The email server 32 operates to receive a message and a desired destination and to transmit the message to the destination in the form of an email. While illustrated as utilizing an email server 32, in other exemplary embodiments, such as that described above, such messages may be transmitted via alternative electronic means including, but not limited to, via IM.

At some point, user A decides to initiate a voice call and a multimedia communication session with user B from the computing device (user A) 18. In an exemplary embodiment, the computing device (user A) 18 transmits a request to the service node 20 to establish a voice call between the computing device (user A) 18 and the phone (user B) 14 and to forward a URL to user B providing user B with a link to a multimedia communication session (step 400). User A may include in the request the DN of user B. As described above, user A may utilize a GUI, such as the GUI 24, to enter such information and transmit the information to the service node 20. The service node 20 may then inform the computing device (user A) 18 that a voice call to user B has been initiated whereupon the browser 18B of user A may display information, such as in a multimedia interaction GUI 28, indicative of a call in process status.

The service node 20 proceeds to request the Public Switched Telephone Network (PSTN) to initiate a voice call to the phone (user B) 14 (step 402). The PSTN in turn alerts the phone (user B) 14 to a phone request such as by causing the phone (user B) 14 to ring (step 404). In an exemplary embodiment, the service node 20 may retrieve an email address associated with user B from a memory device associated with the service node 20 (step 408) or, in another embodiment, the email address may be included in the request of step 400.

In approximate parallel fashion, the service node 20 transmits a message to the email server 32 wherein the message comprises, at least, an address to which the message is to be delivered and an embedded URL link (step 410). In one embodiment, the message may include a text instruction for display to user B. Upon receiving the message from the service node 20, the email server 32 transmits the message to the computing device (user B) 18 (step 412).

When user B answers the phone (user B) 14, the answer event is transmitted to the PSTN (step 414), which proceeds to notify the service node 20 that user B has answered the request to initiate a VoIP call to the computing device (user A) 18 (step 416). The service node 20 proceeds to inform the computing device (user A) 18 that user A is connected to user B via a VoIP call (step 418). The VoIP call having been established, user A and user B may engage in voice communications between the computing device (user A) 18 and the phone (user B) 14 (step 420).

While described sequentially, steps 410-412 may be performed in approximate parallel with steps 402-406 and 414-418. At any time during the VoIP call between user A and user B, user B can activate the URL contained in the message previously transmitted to the computing device (user B) 18 resulting in access to the service node 20 (step 422). Upon receiving the request for access to the URL, the service node 20 replies to the computing device (user B) 18 with information to populate the multimedia interaction GUI 28 displayed on the browser 18B of user B (step 424). Such information may comprise, for example, text information describing the communication session with user A, available multimedia options to be made available to user B, a picture or other identifier of user A, a call subject, a call priority, and the like.

In the exemplary embodiment disclosed, user A selects an option on the multimedia interaction GUI 28 displayed on the browser 18B of the computing device (user A) 18 and instructs the service node 20 of user A's desire to engage in a multimedia session comprising, in this example, transmitting video to user B (step 426). The service node 20 responds by instructing the computing device (user B) 18 to prepare to start receiving video from user A (step 428). The computing device (user B) 18 responds to the service node 20 that it is ready to begin to receive video (step 430) and the service node 20 informs the computing device (user A) 18 that it is OK to commence video transmission (step 432). In response, user A commences to engage in a multimedia sharing session with user B comprising the transmission of video media from computing device (user A) 18 to computing device (user B) 18 (step 434).

In the various exemplary embodiments disclosed above, the URL may have one or more associated attributes. For example, the URL may remain valid only until user A terminates the current multimedia session, may be valid only for user B, may be valid for only one user at a time, or may be generic for any user or group of users. In exemplary and non-limiting embodiments, when user B activates or otherwise selects the received URL during a voice or VoIP call between user A and user B, the service node 20 may associate the URL with user B's URL and store both the URL and the associated DN for later retrieval. Subsequently the service node 20 can retrieve the stored URL and associated DN so that activating or otherwise selecting the URL will initiate a call to user A while establishing a voice connection to a communication device 14 associated with user B.

Figure 8:
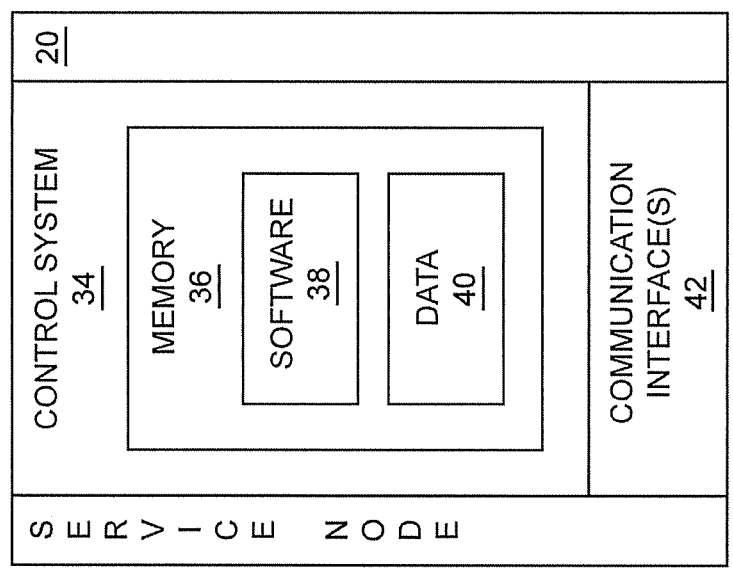
FIG. 8 is a block representation of a service node according to one embodiment of the disclosure.

With reference to FIG. 8, a block representation of the service node 20 is illustrated according to one embodiment. The service node 20 may include a control system 34 having sufficient memory 36 for requisite software 38 and data 40 to operate as described above. The software 38 may provide the communication function, web server function, and interworking function, which are described above. The control system 34 may also be associated with one or more communication interfaces 42 to facilitate communications with the various entities illustrated in the communication environment 10, as well as any other entities being used during the implementation of the present invention.

Figure 9:
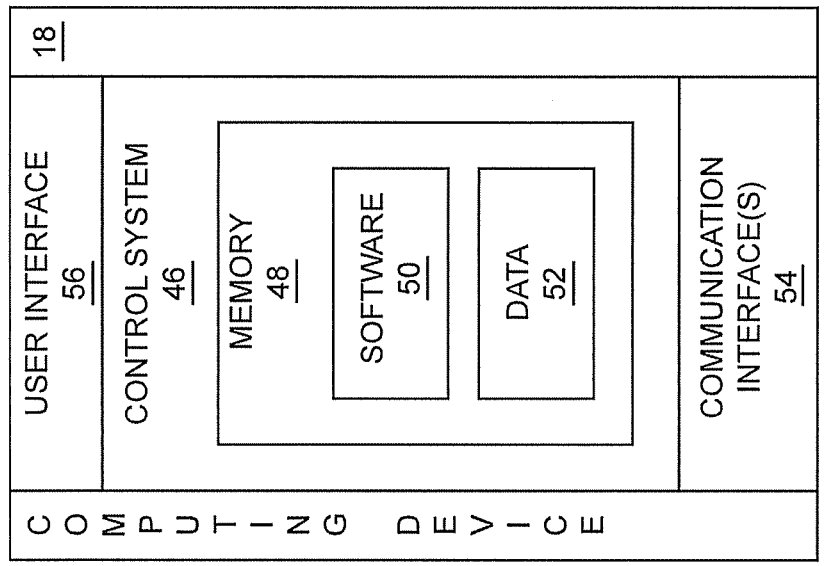
FIG. 9 is a block representation of a computing device (or voice terminal) according to one embodiment of the disclosure.

With reference to FIG. 9, a block representation of a computing device 18 is illustrated. The computing device 18 may represent a telephone, personal computer, or the like, and may include a control system 46 having sufficient memory 48 for requisite software 50 and data 52 to operate as described above. The control system 46 may be associated with one or more communication interfaces 54 to facilitate communications as described above, as well as a user interface 56. The user interface 56 may include input devices such as a keypad, mouse, touchscreen, microphone, and the like, as well as one or more output mechanisms, including speakers, displays, and the like.

Those skilled in the art will recognize improvements and modifications to the embodiments of the present invention. All such improvements and modifications are considered within the scope of the concepts disclosed herein and the claims that follow.

What is claimed is:

1. A method for providing multimedia services performed by a server in a communications network, the method comprising:
   receiving from a first user a request for engaging in multimedia services with a second user;
   generating a Uniform Resource Locator (URL) associated with the request;
   transmitting the URL to an address associated with the second user;
   instructing a call server to establish voice communications between the first user and the second user; and
   enabling multimedia services between the first user and the second user in response to receiving an indication that the second user has accessed the URL, wherein the URL remains valid only until the first user terminates the voice communications.

2. The method of claim 1 wherein instructing the call server to establish voice communications between the first user and the second user comprises instructing the call server to call a first phone associated with the first user and call a second phone associated with the second user.

3. The method of claim 2 wherein the request further comprises a first directory number (DN) of the first phone associated with the first user and a second DN of the second phone associated with the second user.

4. The method of claim 1 wherein the request from the first user is received from a computing device associated with the first user.

5. The method of claim 4 further comprising notifying the computing device that voice communication is enabled between the first phone associated with the first user and the second phone associated with the second user.

6. The method of claim 1 wherein enabling multimedia services further comprises transmitting one or more multimedia services options to the second user.

7. The method of claim 1 wherein transmitting the URL comprises transmitting via Instant Messaging (IM), Short Messaging Service (SMS), Multimedia Messaging Service (MMS), or email.

8. The method of claim 1 wherein the URL remains valid only for a second user.

9. The method of claim 1 wherein the URL may be generic for any user or group of users.

10. The method of claim 1 wherein the multimedia services include at least one of messaging, video, file transfer, application sharing, picture sharing, media streaming, co-browsing, session recording, and conferencing.

11. A service node comprising:
   at least one communication interface; and
   a control system associated with the at least one communication interface and configured to:
   receive from a first user a request for engaging in multimedia services with a second user;
   generate a Uniform Resource Locator (URL) associated with the request;
   transmit the URL to an address associated with the second user;
   instruct a call server to enable voice communication between the first user and the second user; and
   enable multimedia services between the first user and the second user in response to receiving an indication that the second user has accessed the URL, wherein the URL remains valid only for a second user.

12. The service node of claim 11 wherein instructing the call server to enable voice communication comprises instructing a call server to establish voice communications between a first phone associated with the first user and a second phone associated with the second user.

13. The service node of claim 12 wherein the request further comprises a first directory number (DN) of the first phone associated with the first user and a second DN of the second phone associated with the second user.

14. The service node of claim 11 wherein the request from the first user is received from a computing device associated with the first user.

15. The service node of claim 11 further comprising notifying the computing device that voice communication is enabled between the first phone associated with the first user and the second phone associated with the second user.

16. The service node of claim 11 wherein enabling multimedia services further comprises transmitting one or more multimedia services options to the second user.

17. The service node of claim 11 wherein transmitting the URL comprises transmitting via Instant Messaging (IM), Short Messaging Service (SMS), Multimedia Messaging Service (MMS), or email.

18. The service node of claim 17 wherein the URL remains valid only until the first user terminates the voice call.

19. The service node of claim 17 wherein the URL remains valid for only one user at a time.

20. The service node of claim 17 wherein the URL may be generic for any user or group of users.

21. The service node of claim 11 wherein the multimedia services include at least one of messaging, video, file transfer, application sharing, picture sharing, media streaming, co-browsing, session recording, and conferencing.

22. A method for providing multimedia services performed by a device of a first user, the method comprising:
    transmitting, from the device of the first user to a service node a request for engaging in voice communication with a second user and for engaging in multimedia services with the second user;
    receiving from the service node an indication that voice communication between the first user and the second user has been established through a call server; and
    receiving from the service node an indication that multimedia services between the first user and the second user have been established after the second user has accessed a Uniform Resource Locator (URL) sent by the service node to the second user for the purpose of enabling multimedia services, wherein the URL remains valid for only one user at a time.

23. The method of claim 22 wherein the request further comprises a first directory number (DN) of a first phone associated with the first user and a second DN of a second phone associated with the second user.

24. The method of claim 23 wherein the request from the first user is transmitted from a computing device associated with the first user.

25. A non-transitory computer readable medium having stored thereon computer executable instructions that when executed by the processor of a computer control the computer to perform steps comprising:
    receiving from a first user a request for engaging in multimedia services with a second user;
    generating a Uniform Resource Locator (URL) associated with the request;
    transmitting the URL to an address associated with the second user;
    instructing a call server to establish voice communication between the first user and the second user;
and
    enabling multimedia services between the first user and the second user in response to receiving an indication that the second user has accessed the URL, wherein the URL remains valid only until the first user terminates the voice communication.

* * * * *